(12) United States Patent
Ishida et al.

(10) Patent No.: US 7,481,853 B2
(45) Date of Patent: Jan. 27, 2009

(54) METHOD FOR PRODUCING NON-AQUEOUS ELECTROLYTE SECONDARY BATTERY

(75) Inventors: Sumihito Ishida, Mino (JP); Keisuke Tanaka, Suita (JP); Yoshio Moriwaki, Hirakata (JP); Hideo Kaiya, Moriguchi (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 11/383,228

(22) Filed: May 15, 2006

(65) Prior Publication Data

US 2006/0196042 A1    Sep. 7, 2006

Related U.S. Application Data

(62) Division of application No. 10/450,474, filed as application No. PCT/JP02/01171 on Feb. 12, 2002, now Pat. No. 7,166,385.

(30) Foreign Application Priority Data

Mar. 5, 2001    (JP)    ............................... 2001-060872

(51) Int. Cl.
- H01M 4/82    (2006.01)
- H01M 6/00    (2006.01)
- H01M 6/18    (2006.01)
- H01M 6/14    (2006.01)

(52) U.S. Cl. ..................... 29/623.4; 29/623.2; 429/309; 429/303

(58) Field of Classification Search .................. 429/309, 429/303
See application file for complete search history.

(56) References Cited

U.S. PATENT DOCUMENTS 6,617,077 B1 *    9/2003    Ichihashi et al. ............ 429/309

FOREIGN PATENT DOCUMENTS

| EP | 1 018 773 A1 | 7/2000 |
|---|---|---|
| JP | 03-108278 A | 5/1991 |
| JP | 04-171676 A | 6/1992 |
| JP | 04171676 * | 6/1992 |
| JP | 05-275088 A | 10/1993 |
| JP | 05-283055 A | 10/1993 |
| JP | 07-006743 A | 1/1995 |
| JP | 07006743 * | 1/1995 |
| JP | 07-094155 A | 4/1995 |
| JP | 11-162421 A | 6/1999 |
| JP | 11-250872 A | 9/1999 |

(Continued)

*Primary Examiner*—Dah-Wei D Yuan
*Assistant Examiner*—Bryant Suitte
(74) *Attorney, Agent, or Firm*—Panitch Schwarze Belisario & Nadel LLP

(57) ABSTRACT

A non-aqueous electrolyte secondary battery comprising: a positive electrode plate including an outer jacket comprising a sheet-shaped positive electrode current collector and a positive electrode active material layer formed on an inner surface of the outer jacket except for a peripheral portion thereof; a negative electrode plate including an outer jacket comprising a sheet-shaped negative electrode current collector and a negative electrode active material layer formed on an inner surface of the outer jacket except for a peripheral portion thereof; a separator layer comprising a polymer electrolyte interposed between the positive electrode active material layer and the negative electrode active material layer, wherein the peripheral portion of the positive electrode current collector and the peripheral portion of the negative electrode current collector are bonded together, with an insulating material interposed therebetween.

14 Claims, 4 Drawing Sheets

FOREIGN PATENT DOCUMENTS

| | | |
|---|---|---|
| JP | 11-260371 A | 9/1999 |
| JP | 11-265699 A | 9/1999 |
| JP | 2000-012084 A | 1/2000 |
| JP | 2000-067850 A | 3/2000 |
| JP | 2000-156209 A | 6/2000 |
| JP | 2000-223108 A | 8/2000 |
| JP | 2000-357494 A | 12/2000 |
| WO | 95/31836 A1 | 11/1995 |

* cited by examiner

F I G. 3
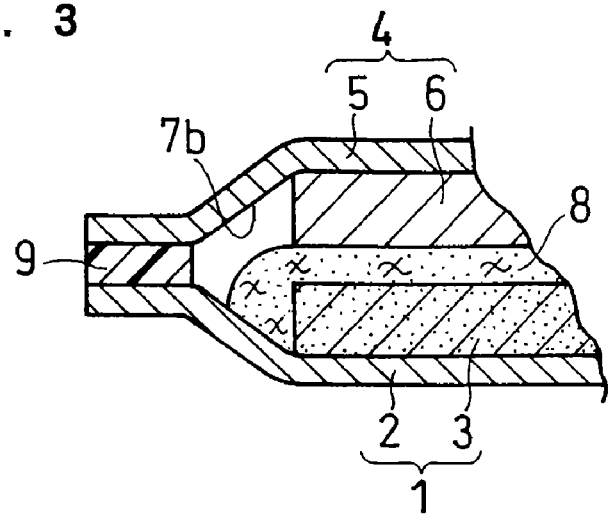
F I G. 4
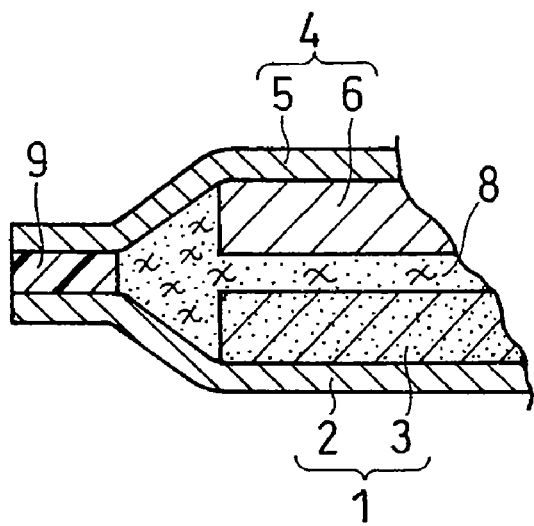
F I G. 5
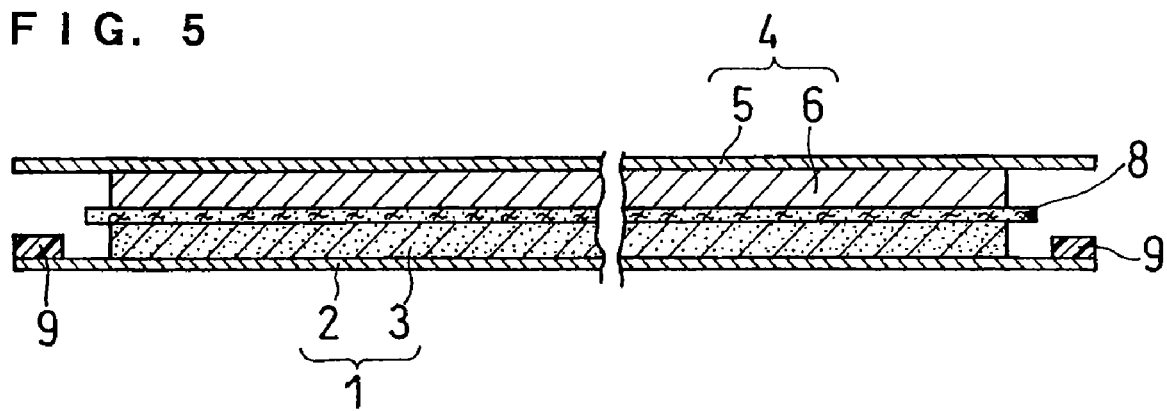

METHOD FOR PRODUCING NON-AQUEOUS ELECTROLYTE SECONDARY BATTERY

CROSS-REFERENCE TO RELATED APPLICATIONS

This application is a divisional of U.S. patent application Ser. No. 10/450,474, filed Jun. 12, 2003, which is a section 371 of International Application No. PCT/JP2002/01171, filed Feb. 12, 2002, and the disclosure of which is incorporated herein by reference.

BACKGROUND OF THE INVENTION

The present invention relates to a thin, lightweight, high energy density non-aqueous electrolyte secondary battery with simplified packaging, and an effective method for producing the same.

Recently, an increasing number of electronic appliances such as AV equipment and personal computers are becoming cordless and portable. With this development, high energy density non-aqueous electrolyte batteries containing a non-aqueous electrolyte are being widely adopted. Among them, lithium secondary battery is the most practically used non-aqueous electrolyte secondary battery.

For negative electrodes of these batteries, materials such as various graphites and amorphous carbons are employed. These are capable of absorbing and desorbing lithium as well as having a low electric potential close to that of lithium.

On the other hand, for the positive electrodes, materials such as lithium-containing transition metal compounds, for example, $LiCoO_2$ and $LiMn_2O_4$, are employed. These are capable of absorbing and desorbing lithium as well as having a high electric potential with respect to lithium.

Electrode plates for these non-aqueous electrolyte batteries are produced, for example, in the following manner. First, to an electrode material, a conductive agent such as carbon fibers or carbon black, a reinforcing material such as a polymeric filler, a binder, a viscosity modifier and the like, and a slurry-like electrode mixture is prepared, using a solvent. This is coated onto a current collector or core material of any of a variety of forms such as a metal sheet, metal mesh, metal lath sheet or a punched metal. The resulting structure, if required, is rolled, dried and cut into a desired shape, thereby forming an electrode plate.

The non-aqueous electrolyte is prepared by dissolving a lithium salt such as $LiPF_6$ or $LiBF_4$ in a non-aqueous solvent. As the non-aqueous solvent, ethylene carbonate, dimethyl carbonate, ethyl methyl carbonate, propylene carbonate, diethyl carbonate or the like is employed. Recently, a mixed solvent of a non-cyclic compound and a cyclic compound is frequently used.

With the recent trend for more compact equipment, there is a strong demand for lightweight batteries that can be accommodated in a space with limited area and volume. In addition, batteries having a sufficient energy density and a thickness of less than several millimeters are required in many cases.

For batteries containing a liquid non-aqueous electrolyte, it is necessary to prevent leakage of the non-aqueous electrolyte. It is also necessary to isolate the power generating elements, such as electrode plates and non-aqueous electrolyte, from the air containing moisture. For this reason, the power generating elements are housed in a container.

In the case of the initially adopted non-aqueous electrolyte batteries, an electrode plate group is formed, for example, by spirally winding or laminating electrode plates together with a separator. Subsequently, the electrode plate group is inserted into a cylindrical or square container, into which a non-aqueous electrolyte is injected. Then, the opening of the container is sealed with a sealing plate serving as an external terminal, thereby completing a battery. Such battery structure, however, is difficult to be designed thinner. Moreover, it is not very reliable in terms of electrolyte leakage.

Recently, polymer electrolytes in a gel-like form in which a liquid non-aqueous electrolyte is retained in a polymer matrix are being employed for batteries. Thin polymer batteries have also been developed, which are fabricated by laminating electrode plates with a separator layer comprising a polymer electrolyte interposed therebetween and covering the whole by a sheet-shaped outer jacket.

The separator layer comprising a polymer electrolyte is formed, for example, by causing a microporous membrane or non-woven fabric each containing a gel-forming agent to absorb a liquid non-aqueous electrolyte and sandwiching it between electrode plates. As the gel-forming agent, a polymer material that forms a gel electrolyte by absorbing a liquid non-aqueous electrolyte is employed.

A separator layer composed only of a polymer electrolyte can also be formed. An example of a method for this is mixing a gel-forming agent and a solvent to prepare a paste, laminating electrode plates with the paste interposed therebetween and drying the whole, followed by causing the gel-forming agent to absorb a liquid non-aqueous electrolyte. Additionally, another method is known, which involves mixing a gel-forming agent and a liquid non-aqueous electrolyte to prepare a paste and laminating electrode plates with the paste interposed therebetween.

The separator layer comprising a polymer electrolyte functions both as an electrolyte to transfer ions and as a separator to separate electrode plates. By housing into a sheet-shaped outer jacket, an electrode plate group formed by successively laminating a positive electrode, a separator layer comprising a polymer electrolyte and a negative electrode, it is possible to produce an extremely thin battery with high energy density.

Japanese Unexamined Patent Publication No. 2000-67850 discloses a technique of integrating electrode plates with a separator layer comprising a polymer electrolyte interposed therebetween.

For example, Japanese Unexamined Patent Publication No. 2000-12084 and Japanese Unexamined Patent Publication No. Hei 9-506208 disclose an electrode plate group having: a positive electrode plate comprising a current collector and an active material layer formed on one side thereof; a negative electrode plate comprising a current collector and an active material layer formed on one side thereof; and a separator layer comprising a polymer electrolyte interposed between the two active material layers.

Japanese Unexamined Patent Publication No. Hei 11-265699 discloses a structure in which electrode plates laminated with a separator layer comprising a polymer electrolyte interposed therebetween is housed in a bag-shaped outer jacket equipped with a safety venting mechanism.

For example, Japanese Unexamined Patent Publication Nos. 2000-156209 and 2000-223108 disclose an electrode plate group comprising: two electrode plates each comprising a current collector and an active material layer formed on one side thereof; a single electrode plate having an active material layer on each side thereof; and a separator layer interposed therebetween. This electrode plate group is covered by a sheet-shaped outer jacket.

In each of the above-described conventional thin batteries, the electrode plate group is housed in an outer jacket that is separately prepared. There is a limit to the possible reduction in thickness and improvement in energy density of batteries, as long as these are attempted based upon the idea of using a separately prepared outer jacket. There is also a limit to the possible simplification of packaging and of the manufacturing process of batteries.

BRIEF SUMMARY OF THE INVENTION

It is an object of the present invention to provide a high energy density non-aqueous electrolyte secondary battery that is dramatically thinner and lighter than its conventional counterparts, with a simplified packaging. It is another object of the present invention to provide an efficient method for producing a non-aqueous electrolyte secondary battery that does not require an outer-packing or sheathing step and allows a series of steps to be performed continuously with less man-hours.

The present invention relates to a non-aqueous electrolyte secondary battery comprising:

a positive electrode plate including an outer jacket comprising a sheet-shaped positive electrode current collector and a positive electrode active material layer formed on an inner surface of the outer jacket except for a peripheral portion thereof;

a negative electrode plate including an outer jacket comprising a sheet-shaped negative electrode current collector and a negative electrode active material layer formed on an inner surface of the outer jacket except for a peripheral portion thereof; and a separator layer comprising a polymer electrolyte interposed between the positive electrode active material layer and the negative electrode active material layer, wherein the peripheral portion of the positive electrode current collector and the peripheral portion of the negative electrode current collector are bonded together with an insulating material interposed therebetween.

Here, it is preferable that the positive electrode active material layer comprises a metal oxide and the negative electrode active material layer comprises a carbon material. It is also preferable that the positive electrode current collector comprises aluminum or an aluminum alloy and the negative electrode current collector comprises copper or a copper alloy. Alternatively, it is preferable that the positive electrode current collector comprises aluminum or an aluminum alloy, the negative electrode current collector comprises copper, a copper alloy, iron or an iron alloy and the negative electrode current collector further has a nickel plating on a surface thereof.

It is preferable that a resin layer is formed on an outer surface of each of the positive electrode current collector and the negative electrode current collector.

It is preferable that each of the positive electrode current collector and the negative electrode current collector has a thickness of 10 to 100 μm.

It is preferable that the polymer electrolyte comprises a liquid non-aqueous electrolyte and a polymer material retaining the above-mentioned electrolyte.

The present invention also relates to a battery assembly comprising a plurality of the above-described non-aqueous electrolyte secondary batteries, wherein at least one of a plurality of positive electrode plates and a plurality of negative electrode plates constituting the battery assembly form an electrode plate assembly including an outer jacket comprising a band-shaped current collector and a plurality of active material layers discontinuously formed on an inner surface of the outer jacket except for a peripheral portion thereof.

A high capacity battery can be provided by bending the battery assembly at portions connecting the batteries in such a manner that current collectors having the same polarity of adjacent batteries face each other.

The present invention also relates to a method for producing a non-aqueous electrolyte secondary battery comprising the steps of:

(1) forming a positive electrode active material layer on an inner surface of an outer jacket comprising a sheet-shaped positive electrode current collector except for a peripheral portion of the outer jacket, thereby producing a positive electrode plate;

(2) forming a negative electrode active material layer on an inner surface of an outer jacket comprising a sheet-shaped negative electrode current collector except for a peripheral portion of the outer jacket, thereby producing a nagative electrode plate;

(3) integrating into one piece the positive electrode plate and the negative electrode plate, with a separator layer comprising a polymer electrolyte or a starting material thereof interposed between the positive electrode active material layer and the negative electrode active material layer; and (4) bonding the peripheral portion of the positive electrode current collector and the peripheral portion of the negative electrode current collector, which face each other, with an insulating material interposed therebetween.

Here, it is preferable that the step (1) comprises a step of discontinuously forming a plurality of positive electrode active material layers in a single or plural rows on an inner surface of an outer jacket comprising a band-shaped positive electrode current collector except for a peripheral portion of the outer jacket, thereby producing an assembly of a plurality of positive electrode plates. Additionally, it is preferable that each of the positive electrode plates is separated from the assembly, after the step (3).

It is also preferable that the step (2) comprises a step of discontinuously forming a plurality of negative electrode active material layers in a single or plural rows on an inner surface of an outer jacket comprising a band-shaped negative electrode current collector except for a peripheral portion of the outer jacket, thereby producing an assembly of a plurality of nagative electrode plates. Additionally, it is preferable that each of the negative electrode plates is separated from the assembly, after the step (3).

In the step (4), it is advantageous to perform a step of providing unbonded regions between the peripheral portions that face each other, and further perform, after the step (4), a step of injecting a liquid non-aqueous electrolyte via the unbonded regions, followed by bonding the unbonded regions under a reduced pressure, with an insulating material interposed therebetween.

The present invention also relates to a method for producing a non-aqueous electrolyte secondary battery, wherein the step (1) is a step of discontinuously forming a plurality of positive electrode active material layers on an inner surface of an outer jacket comprising a band-shaped positive electrode current collector except for a peripheral portion of the outer jacket, thereby producing an assembly of a plurality of positive electrode plates, the step (2) is a step of discontinuously forming a plurality of negative electrode active material layers on an inner surface of an outer jacket comprising a band-shaped negative electrode current collector except for a peripheral portion of the outer jacket, thereby producing an assembly of a plurality of nagative electrode plates, the step (3) is a step of integrating into one piece the assembly of positive electrode plates and the assembly of negative electrode plates, with a separator layer comprising a polymer electrolyte or a starting material thereof interposed between each of the positive electrode active material layers and each of the negative electrode active material layers, the step (4) is a step of bonding the peripheral portion of the positive electrode current collector and the peripheral portion of the negative electrode current collector that face each other, with an insulating material interposed therebetween, thereby producing a battery assembly, and the method further includes a step of separating a resultant battery assembly at suitable positions.

In the case of producing a battery assembly, it is preferable that the step (1) comprises a step of discontinuously applying a positive electrode mixture on an inner surface of an outer jacket comprising a band-shaped positive electrode current collector except for a peripheral portion of the outer jacket, thereby forming a plurality of positive electrode active material layers, the step (2) comprises a step of discontinuously applying a negative electrode mixture on an inner surface of an outer jacket comprising a band-shaped negative electrode current collector except for a peripheral portion of the outer jacket, thereby forming a plurality of negative electrode active material layers, and the step (3) comprises a step of applying a paste comprising a polymer electrolyte or a starting material thereof on at least one of the plurality of positive electrode active material layers and the plurality of negative electrode active material layers.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is a vertical sectional view of an end portion of another example of the non-aqueous electrolyte secondary battery in accordance with the present invention.

FIG. 4 is a vertical sectional view of an end portion of still another example of the non-aqueous electrolyte secondary battery in accordance with the present invention.

FIG. 5 is a vertical sectional view of an example of the non-aqueous electrolyte secondary battery in accordance with the present invention in an unfinished state, before the peripheral portions of the current collectors are bonded together.

DETAILED DESCRIPTION OF THE INVENTION

The non-aqueous electrolyte secondary battery of the present invention includes a positive electrode plate, a negative electrode plate, a separator layer comprising a polymer electrolyte and an insulating material, and it is of a simple structure that does not require the use of a separate outer jacket.

Figure 1:
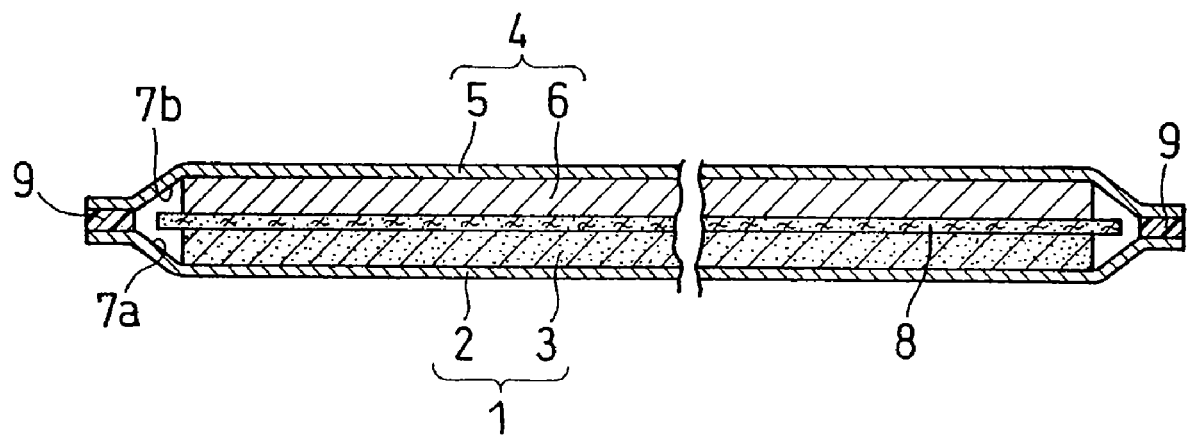
FIG. 1 is a vertical sectional view of an example of the non-aqueous electrolyte secondary battery in accordance with the present invention.

FIG. 1 shows a vertical sectional view of an example of the non-aqueous electrolyte secondary battery in accordance with the present invention. A positive electrode plate 1 includes a positive electrode current collector 2 serving as an outer jacket and a positive electrode active material layer 3 formed on the inner surface thereof, and a negative electrode plate 4 includes a negative electrode current collector 5 serving as an outer jacket and a negative electrode active material layer 6 formed on the inner surface thereof. A separator layer 8 comprising a polymer electrolyte is interposed between the active material layers so as to prevent a short circuit between them. Between a peripheral portion 7a of the positive electrode current collector 2 and a peripheral portion 7b of the negative electrode current collector 5 where no active material layer is disposed, a resin 9 is disposed as an insulating material, and the resin 9 bonds the two electrode plates while sealing the inside of the battery.

The resin 9 is preferably in the form of a film. As the method for bonding the two electrode plates, it is advantageous to sandwich a resin in film form between the peripheral portions of the current collectors of the two electrode plates 1 and 4 and to heat the peripheral portions while applying pressure from the outside. In the above-described method, instead of using a resin in film form, a thermosetting resin in paste form may be applied to the peripheral portion of at least one of the two current collectors 2 and 5. Alternatively, a resin layer that exerts an adherability upon heating may be formed on the peripheral portion of at least one of the two current collectors 2 and 5.

Because of its simple structure as described above, the non-aqueous electrolyte secondary battery of the present invention is substantially completed when the step of laminating the electrode plates is finished, so that the battery will be completed by the subsequent step of simply bonding the peripheral portions of the two current collectors.

The positive electrode current collector 2 and the negative electrode current collector 5 serve as the outer jacket of the battery, and the sides thereof having no active material layer serve as the exterior surface of the battery. Therefore, a metal sheet having no pores is used for the current collectors. Here, the metal sheet may also be a metal film.

Since the active material layer is formed on one side of the metal sheet, the thickness of the metal sheet may be smaller than that of the one used for the outer jacket of a conventional thin battery, and it may be, for example, about 10 μm. The energy density of the battery is decreased when the thickness of the metal sheet is too large, so that the thickness of the metal sheet is preferably 10 to 100 μm.

The metal sheet is selected in consideration of the corrosion resistance. For producing the positive electrode current collector 2, the metal sheet preferably comprises aluminum or an aluminum alloy. For producing the negative electrode current collector 5, on the other hand, the metal sheet preferably comprises copper, a copper alloy, iron or an iron alloy. It is preferable to nickel plate the surface of the negative electrode current collector 5. When the negative electrode current collector 5 comprises iron or an iron alloy, it is particularly effective to nickel plate the surface.

For the purpose of reinforcement, a resin, a polymer material or the like can be laminated on the outer surface of the current collector where no active material layer is disposed. On the surface of the current collector where the active material layer is formed, it is preferable to form a layer that comprises a conductive resin.

The active material layer is formed by providing a mixture in paste form containing an active material on one side of the current collector. In addition to the active material, the mixture can contain, as required, a conductive agent, a binder, a dispersion medium, a polymer electrolyte described below, a polymer material serving as the starting material of the above-mentioned polymer electrolyte and the like. There is no particular limitation on the method for providing the mixture on the current collector. For example, it is efficient to discontinuously apply the mixture on one side of a long, band-shaped current collector except for the peripheral portion thereof, using a common coating device, thereby successively forming a plurality of active material layers.

It is preferable that each of the positive electrode active material layer 3 and the negative electrode active material layer 6 has a thickness of, for example, 30 to 300 µm.

As the positive electrode active material, metal oxides are preferable. Among them, lithium-containing transition metal oxides, such as $LiCoO_2$, $LiNiO_2$ and $LiMn_2O_4$, are particularly preferable. These may be used alone, or two or more of these may be used in combination.

As the negative electrode active material, a variety of graphite-based carbon materials and amorphous carbon materials are preferable. These may be used alone, or two or more of these may be used in combination.

As the conductive agent, carbon powder such as graphite powder or carbon black, or carbon fibers can be used.

As the binder, a fluorocarbon resin that is stable with respect to a non-aqueous electrolyte is preferable. Examples of the above-mentioned fluorocarbon resin include polytetrafluoroethylene, a copolymer of tetrafluoroethylene and hexafluoropropylene, polyvinylidene fluoride and a copolymer of vinylidene fluoride and hexafluoropropylene.

As the dispersion medium, N-methyl-2-pyrrolidone or the like is preferably used.

The separator layer 8 contains a polymer electrolyte. "Polymer electrolyte" means a solid or gel-like electrolyte containing a polymer material. In general, it is preferable to use a polymer electrolyte in which a liquid non-aqueous electrolyte is retained in a matrix formed by a polymer material that crosslinks by UV irradiation or heating.

It is preferable that the crosslinking polymer material has chemical durability to a non-aqueous electrolyte and is capable of withstanding repeated charge and discharge at high voltages. From the above viewpoint, a fluorocarbon resin, an ionomer resin and the like are suitable as the crosslinking polymer. For example, polyvinylidene fluoride and a copolymer obtained by graft copolymerization of a low molecular weight polyhexafluoropropylene with polyvinylidene fluoride are suitable.

As the liquid non-aqueous electrolyte retained in the polymer material, those that are conventionally known and commonly used in non-aqueous electrolyte batteries can be used without limitation. For example, it is preferable to use a liquid non-aqueous electrolyte comprising a non-aqueous solvent and a solute dissolved in the non-aqueous solvent.

As the non-aqueous solvent, ethylene carbonate, dimethyl carbonate, ethyl methyl carbonate, propylene carbonate, diethyl carbonate and the like are suitable. While these may be used alone, it is preferable to use two or more of these in combination.

As the above-described solute, lithium salts such as $LiPF_6$ and $LiBF_4$ are preferable. These may be used alone, or two or more of these may be used in combination.

The thickness of the separator layer 8 is preferably 10 to 200 µm, but it is not limited to this range. When the thickness of the separator layer is too small, a short circuit may occur between the electrode plates when the electrode plate group is integrated into one piece by pressurization, and when it is too large, the internal resistance of the battery may increase.

In addition to the polymer material and the liquid non-aqueous electrolyte, it is advantageous to mix an insulating powder such as alumina or silica with the separator layer. These powders can improve the function of the separator layer to separate the electrode plates.

It is preferable to provide the polymer electrolyte also within each of the active material layers. By including the polymer electrolyte within the active material layer, an ion conductive network can be effectively formed within the active material layer. Moreover, the bonding strength between the separator layer and each of the electrode plates can also be enhanced.

In order to provide the polymer electrolyte within the active material layer, a polymer electrolyte or the starting material thereof may be mixed with a mixture for forming the active material layer, for example. Alternatively, after diluting the polymer electrolyte or the starting material with a solvent, the active material layer may be impregnated therewith.

The following are examples of the method for disposing the separator layer 8 between the positive electrode active material layer and the negative electrode active material layer.

The first method comprises the steps of: mixing a starting material of a polymer electrolyte and a solvent, thereby preparing a high viscosity paste; coating the obtained paste onto at least one of a positive electrode active material layer and a negative electrode active material layer; laminating electrode plates with the paste interposed therebetween, thereby forming an electrode plate group; drying the electrode plate group; and then causing the electrode plate group to absorb a liquid non-aqueous electrolyte. As the solvent mixed with the starting material of the polymer electrolyte, it is preferable to use N-methyl-2-pyrrolidone or the like. The viscosity of the paste can be adjusted through the amount of the solvent to a viscosity suitable for coating.

The second method comprises the steps of: mixing a starting material of a polymer electrolyte and a liquid non-aqueous electrolyte, thereby preparing a high viscosity paste; coating the obtained paste on at least one of a positive electrode active material layer and a negative electrode active material layer; and laminating electrode plates with the paste interposed therebetween.

The third method comprises the steps of: coating a high viscosity paste comprising a polymer electrolyte on at least one of a positive electrode active material layer and a negative electrode active material layer; and laminating electrode plates with the paste interposed therebetween.

According to the first, second and third methods, the lamination of the electrode plates and the integration of the electrode plates can be readily performed with high efficiency, so that these methods are preferable in terms of automating the formation steps of the electrode plate group.

The fourth method comprises the steps of: preparing a separator comprising a microporous film or nonwoven fabric each containing a starting material of a polymer electrolyte; and sandwiching the obtained separator between a positive electrode active material layer and a negative electrode active material layer. The separator may be previously caused to absorb a liquid non-aqueous electrolyte. Alternatively, the electrode plate group may be caused to absorb a liquid non-aqueous electrolyte, after forming an electrode plate group in which a separator is sandwiched between a positive electrode active material layer and a negative electrode active material layer.

The fifth method comprises the steps of: mixing a starting material of a polymer electrolyte and a solvent, thereby preparing a high viscosity paste; molding the obtained paste in the form of a sheet, thereby preparing a separator; impregnating the obtained separator with a liquid non-aqueous electrolyte; and sandwiching the separator retaining the non-aqueous electrolyte between a positive electrode active material layer and a negative electrode active material layer.

The sixth method comprises the steps of: mixing a starting material of a polymer electrolyte and a solvent, thereby preparing a high viscosity paste; molding the obtained paste in the form of a sheet, thereby preparing a separator; laminating electrode plates with the obtained separator interposed therebetween, thereby forming an electrode plate group; and causing the electrode plate group to absorb a liquid non-aqueous electrolyte.

In the fifth and sixth method, it is preferable to use N-methyl-2-pyrrolidone or the like as the solvent. An oil component such as dibutyl phthalate can be additionally mixed with the obtained high viscosity paste. A separator in sheet form prepared from a paste containing an oil component is washed with a solvent such as hexane or acetone. Since the oil component is removed from the separator by washing, a large number of micropores are formed in the separator.

It should be noted that in the above-described first to sixth methods, the starting material of the polymer electrolyte refers to a gel-forming agent, and the above-described crosslinking polymer material is preferably used.

Figure 2:
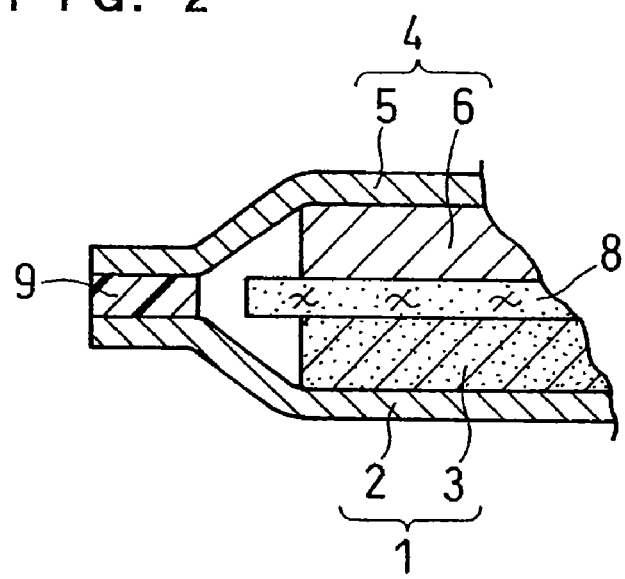
FIG. 2 is a vertical sectional view of an end portion of an example of the non-aqueous electrolyte secondary battery in accordance with the present invention.

FIG. 2 is a vertical sectional view of a peripheral portion of the non-aqueous electrolyte secondary battery shown in FIG. 1. Although the separator layer 8 is interposed between the positive electrode active material layer 3 and the negative electrode active material layer 6 in FIG. 2, there is a space in the peripheral portion of the battery.

FIG. 3 is a vertical sectional view of a peripheral portion of another non-aqueous electrolyte secondary battery in accordance with the present invention. In FIG. 3, the entire surface of the positive electrode active material layer 3 is enclosed by the separator layer 8. Accordingly, the possibility of short circuits is much lower in the battery shown in FIG. 3 than in the battery shown in FIG. 2.

FIG. 4 is a vertical sectional view of a peripheral portion of still another non-aqueous electrolyte secondary battery in accordance with the present invention. In FIG. 4, the entire surface of each of the positive electrode active material layer 3 and the negative electrode active material layer 6 is enclosed by the polymer electrolyte continuous to the separator layer 8. Since the internal space of the battery is filled with a gel-like polymer electrolyte, the possibility of short circuits is even lower in this battery than in the battery shown in FIG. 3. Moreover, when the internal space of the battery is filled with the polymer electrolyte, the strength of the battery is increased.

In order to obtain a battery as shown in FIG. 4, it is advantageous, for example, to broaden the area coated with a high viscosity paste by employing any one of the above-described first to third methods, and to bond a positive electrode plate and the negative electrode plate, followed by reducing the pressure inside the battery.

In order to obtain a battery as shown in FIG. 4, it is also effective to apply the high viscosity paste onto both a positive electrode active material layer and a negative electrode active material layer. That is, a positive electrode plate and a negative electrode plate are placed on each other, after coating the high viscosity paste onto each of the electrode plates so as to enclose the entire surfaces of the positive electrode active material layer and the negative electrode active material layer.

FIG. 5 shows the battery shown in FIG. 1 in an unfinished state, and is a vertical sectional view of the electrode plate group, before the peripheral portions of the current collectors are bonded together. As shown in FIG. 5, the resin 9 is previously disposed at the peripheral portion of one of the current collectors. While the resin 9 is disposed at the peripheral portion of the positive electrode current collector 2 in FIG. 5, it is also possible to dispose it at the peripheral portion of the negative electrode current collector 5.

As the resin 9, an insulating resin that is resistant to a non-aqueous electrolyte can be used. For example, a thermosetting resin such as an epoxy resin or a polyolefin-based thermoplastic resin can be employed. The polyolefin-based thermoplastic resin is superior in terms of workability. As the resin 9 used for bonding, a resin exerting little influence on the separator layer 8 and having a high melting point is desirable. Polypropylene, which can perform bonding at a temperature around 200° C., is particularly preferable.

It is preferable that the integration of the electrode plate group by pressurization is performed under predetermined conditions. It is preferable to perform the pressurization of the electrode plate group at a crosslinking temperature of the polymer material constituting the polymer electrolyte. By pressurizing the electrode plate group at a crosslinking temperature of the polymer material, it is possible to integrate the electrode plates into one piece, simultaneously with the crosslinking of the polymer material. A suitable crosslinking temperature of a polymer material depends on the type of the polymer material, and it is 80 to 130° C. in the case of using the above-described polymer material.

Next, an example of an effective method for producing the non-aqueous electrolyte secondary battery of the present invention is described.

First, positive electrode plates and negative electrode plates are produced.

Figure 6:
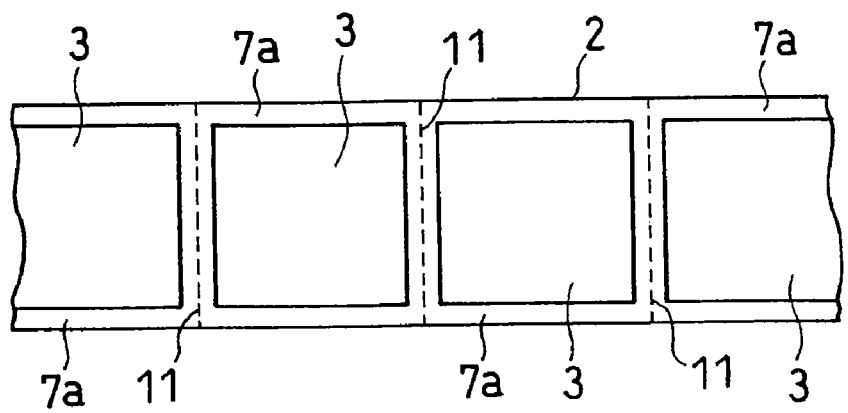
FIG. 6 is a top plan view of a positive electrode plate assembly obtained by discontinuously forming a plurality of positive electrode active material layers on one side of a band-shaped positive electrode current collector.

It is advantageous to provide the positive electrode plates as an assembly as shown in FIG. 6, by discontinuously forming a plurality of active material layers on one side of a band-shaped current collector having a length equivalent to that of a plurality of batteries, while leaving the peripheral portion free. In FIG. 6, a plurality of the positive electrode active material layers 3 are discontinuously formed on one side of the band-shaped positive electrode current collector 2. The peripheral portions 7a where no active material layer 3 is disposed are provided in the areas surrounding the active material layer 3. Broken lines 11 indicate cutting positions when the positive electrode plates are separated. The negative electrode plates are produced in the same manner as the positive electrode plates.

Subsequently, a paste comprising a polymer electrolyte or the starting material thereof is coated onto the positive electrode active material layers and the negative electrode active material layers so as to cover the entire surfaces of the active material layers.

Figure 7:
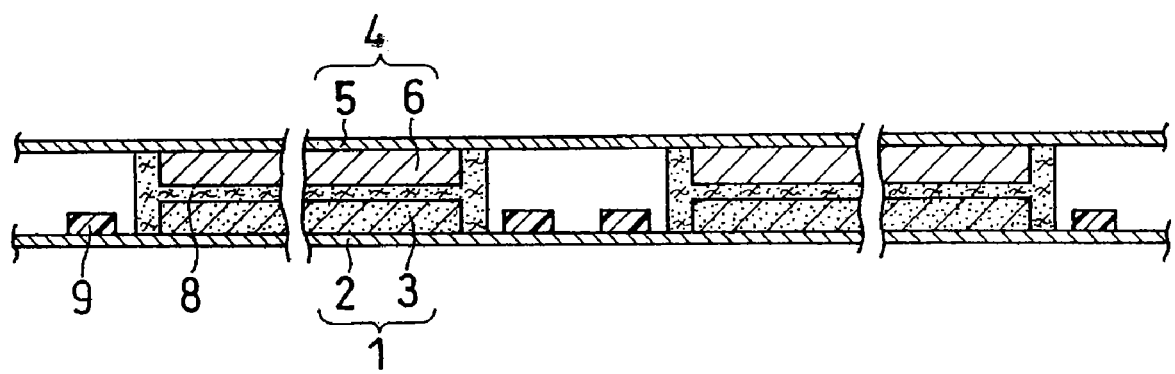
FIG. 7 is a vertical sectional view of an example of the battery assembly in accordance with the present invention in an unfinished state, before the peripheral portions of the current collectors are bonded together.

Thereafter, the resin 9 serving as an insulating material is provided in a predetermined position of the peripheral portion of the positive electrode plates or the negative electrode plates and the electrode plates are laminated such that their active material layers face each other, producing an electrode plate group assembly as shown in FIG. 7. Although the resin 9 is provided at the peripheral portion of the positive electrode current collector 2 in FIG. 7, the resin 9 may be provided at the peripheral portion of the negative electrode current collector 5.

During the lamination of the electrode plates, it is advantageous to pressurize each of the electrode plate groups by feeding the electrode plates into a pressurizing device, either all at once or one by one in succession, thereby integrating them into one piece. This makes it possible to efficiently produce the electrode plate groups in large quantities.

Figure 8:
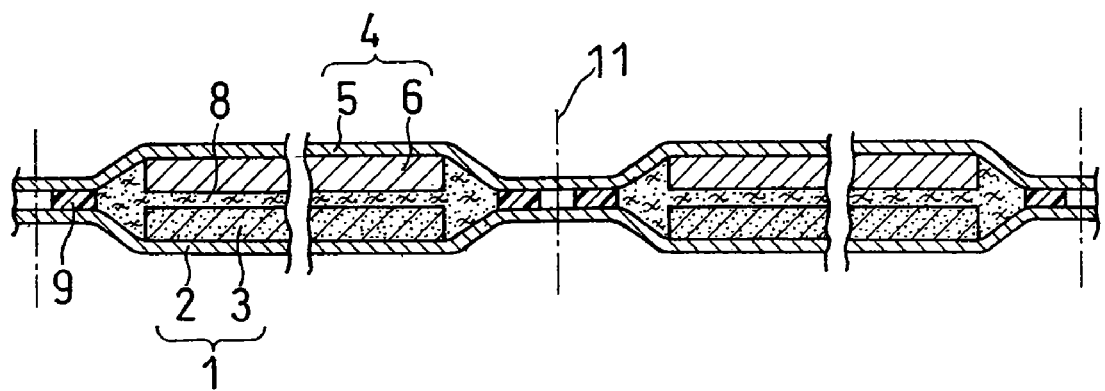
FIG. 8 is a vertical sectional view of an example of the battery assembly in accordance with the present invention.

By subsequently bonding the peripheral portions of the electrode plates together, it is possible to produce an assembly of batteries as shown in FIG. 8. It should be noted that the bonding step of the peripheral portions of the electrode plates may be performed simultaneously with the integration of the electrode plate groups by pressurization. The obtained assembly of batteries can be separated at suitable cutting positions 11 and can be shipped as a single piece of battery or as an assembly of a plurality of batteries.

Figure 9:
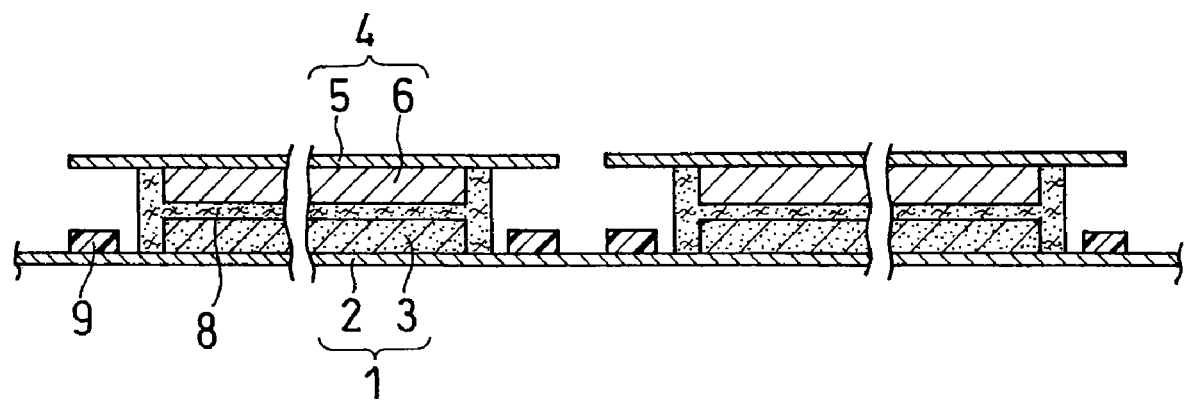
FIG. 9 is a vertical sectional view of another example of the battery assembly in accordance with the present invention in an unfinished state, before the peripheral portions of the current collectors are bonded together.

The method of using both of the positive electrode plates and the negative electrode plates as an assembly was described in this embodiment; however, as shown in FIG. 9, it is also possible to produce batteries efficiently and continuously by using only the positive electrode plates as an assembly and using the negative electrode plates after cutting them into individual battery units. The same applies to the converse case where only the negative electrode plates are used as an assembly.

Figure 10:
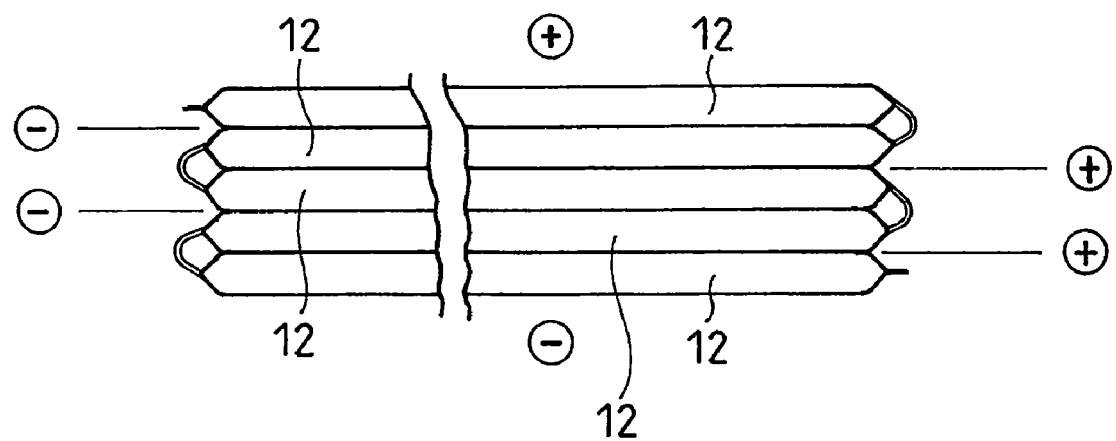
FIG. 10 is a front view of a battery assembly, bent at portions where the batteries are joined in order for current collectors having the same polarity of adjacent batteries to face each other.

When an assembly is formed by a plurality of connected batteries, the assembly can be bent as shown in FIG. 10. In FIG. 10, the current collectors having the same polarity of adjacent batteries 12 face each other, so that a plurality of batteries form a parallel circuit. Accordingly, a large-capacity battery can be produced by bending an assembly of batteries in this manner.

In the following, the present invention is specifically described by way of examples.

In the present examples, a battery as shown in FIG. 1 was produced.

EXAMPLE 1

(i) Production of Positive Electrode Plate $LiCoO_2$ as a positive electrode active material, carbon powder as a conductive agent, a polymer material as a starting material of a polymer electrolyte, and N-methyl-2-pyrrolidone were mixed to obtain a positive electrode mixture. As the above-described polymer material, a copolymer (hereinafter, referred to as P(VDF-HFP)) having 90 wt % of vinylidene fluoride units and 10 wt % of hexafluoropropylene units was used. The weight ratio of the active material: the conductive agent: P(VDF-HFP) was set to 100:5:8.

A band-shaped aluminum film having a width of 150 mm and a thickness of 30 μm was used as a current collector.

By a coating process using an intaglio plate, the positive electrode mixture was discontinuously applied onto one side of the above-described band-shaped current collector to form a plurality of positive electrode active material layers, thereby producing a positive electrode plate assembly as shown in FIG. 6. The thus formed positive electrode active material layers were each in the shape of a square of 86 mm×86 mm, having a thickness of 120 μm. The active material was not provided at the peripheral portion of the current collector. The interval provided between the active material layers in the row direction was 20 to 22 mm.

(ii) Production of Negative Electrode Plate

Graphite powder as a negative electrode active material, carbon black as a conductive agent, a polymer material as a starting material of a polymer electrolyte, and N-methyl-2-pyrrolidone were mixed to obtain a negative electrode mixture. As the above-described polymer material, the same copolymer (P(VDF-HFP)) as used for the positive electrode plate, having 90 wt % of vinylidene fluoride units and 10 wt % of hexafluoropropylene units, was used. The weight ratio of the active material:the conductive agent:P(VDF-HFP) was set to 100:8:14.

A band-shaped copper film having a width of 150 mm and a thickness of 30 μm was used as a current collector.

By a coating process using an intaglio plate, the negative electrode mixture was discontinuously applied onto one side of the above-described band-shaped current collector to form a plurality of negative electrode active material layers, thereby producing a negative electrode plate assembly. The thus formed negative electrode active material layers were each in the shape of a square of 88 mm×88 mm, having a thickness of 120 μm. The active material was not provided at the peripheral portion of the current collector. The interval provided between the active material layers in the row direction was about 16 mm.

(iii) Production of Electrode Plate Group

First, a polypropylene film having a width of 5 mm and a thickness of 50 μm was disposed as an adhesive material at the peripheral portion of the positive electrode current collector so as to enclose each of the positive electrode active material layers. Here, a material that does not melt by heat was placed on a part of the peripheral portion, since it is necessary to preserve an unbonded region for injecting a non-aqueous electrolyte.

Thereafter, a separator layer comprising a starting material of a polymer electrolyte was formed on the positive electrode active material layer of the positive electrode plate. Specifically, on the positive electrode active material layer, a mixture comprising a copolymer (P(VDF-HFP)) having 90 wt % of vinylidene fluoride units and 10 wt % of hexafluoropropylene units and N-methyl-2-pyrrolidone was applied in the shape of a square of 89×89 mm, having a thickness of about 25 μm, in such a manner that the active material was completely covered therewith, followed by drying.

Subsequently, the positive electrode plate assembly and the negative electrode plate assembly were laminated such that the positive electrode active material layer and the negative electrode active material layer faced each other, then heated under a pressure of 60 gf/cm² until the surface temperature of each of the electrode plates reached 120° C., and integrated into one piece in a flat manner, thereby producing an electrode plate group assembly.

(iv) Bonding of Peripheral Portions

The peripheral portion of each of the electrode plates of the electrode plate group assembly was pressurized for three seconds at 220±5° C. under 10 kgf/cm², and the peripheral portions of the electrode plates were bonded together by melting the polypropylene film disposed on the peripheral portions.

Meanwhile, a non-aqueous electrolyte was prepared by dissolving 1 mol/L LiPF$_6$ in a mixed solvent of ethylene carbonate and diethyl carbonate at a volume ratio of 1:1.

Subsequently, from the above-described unbonded region, the thus prepared non-aqueous electrolyte was injected under reduced pressure, and heated to 60° C. or higher to cause the gelation of P(VDF-HFP) in the electrode plates and the separator layers. Thereafter, the pressure inside the battery was reduced and the unbonded region was sealed. This gave an assembly of batteries A each having a completely sealed structure, as shown in FIG. 8.

EXAMPLE 2

An assembly of batteries B each having a completely sealed structure was produced in the same manner as in Example 1, except that the thickness of each of the positive electrode active material layer and the negative electrode active material layer was set to 240 μm.

EXAMPLE 3

An assembly of batteries C each having a completely sealed structure was produced in the same manner as in Example 1, except that the thickness of each of the positive electrode active material layer and the negative electrode active material layer was set to 360 μm.

EXAMPLE 4

An assembly of batteries D each having a completely sealed structure was produced in the same manner as in Example 1, except that a polypropylene layer having a thickness of 40 μm was formed on the outer surface of each of the positive electrode current collector and the negative electrode current collector, with the exception of the position to be connected to an external terminal.

EXAMPLE 5

An assembly of batteries E each having a completely sealed structure was produced in the same manner as in Example 1, except that the thickness of each of the positive electrode active material layer and the negative electrode active material layer was set to 60 μm.

COMPARATIVE EXAMPLE 1

A piece of battery separated from the assembly of the batteries A produced in Example 1 was covered by a 150 μm thick outer jacket comprising an Al foil and a polypropylene layer, followed by sealing. Here, a lead was connected to each of the positive electrode plate and the negative electrode plate prior to the covering by the outer jacket. Then, the positive electrode lead and the negative electrode lead were guided outside of the outer jacket. Thus, a battery F was produced. The battery F is the equivalent of a conventional thin battery.

The energy densities of the batteries A to F were calculated from the amounts of the active material used for the respective batteries. The results are shown in Table 1. Additionally, the discharge characteristics and the capacity retention ratios of the batteries A to F were determined as follows.

(Discharge Characteristics)

Each battery was charged at 20° C. with a current of 1 C (1 hour rate) until the battery voltage reached 4.2 V, and thereafter, the charging was continued at a constant voltage until the current reached 0.05 C. Subsequently, the battery in a charged state was discharged at 20° C. with a current of 0.2 C (5 hour rate) until the battery voltage reached 3 V.

Then, the battery was charged again at 20° C. with a current of 1 C until the battery voltage reached 4.2 V, and thereafter, the charging was continued at a constant voltage until the current reached 0.05 C. Subsequently, the battery in a charged state was discharged at 20° C. with a current of 2 C (0.5 hour rate) until the battery voltage reached 3 V.

The ratio of the discharge capacity obtained when discharging at 2 C to the discharge capacity obtained when discharging at 0.2 C (2 C/0.2 C) was evaluated. The results are shown in percentage in Table 1.

(Capacity Retention Ratio after Cycling)

Each battery was charged at 20° C. with a current of 1 C until the battery voltage reached 4.2 V, and thereafter, the charging was continued at a constant voltage until the current reached 0.05 C. Subsequently, the battery in a charged state was discharged at 20° C. with a current of 1 C until the battery voltage reached 3 V. This operation was repeated 500 times. Then, the ratio of the discharge capacity at the 500th cycle to the discharge capacity at the first cycle was determined.

The results are shown in percentage in Table 1.

TABLE 1

| Battery | Thickness of positive electrode active material layer (μm) | Thickness of negative electrode active material layer (μm) | Presence of polypropylene layer | Energy density (Wh/l) | Capacity retention ratio after 500 cycles (%) | 2 C/0.2 C (%) |
|---|---|---|---|---|---|---|
| A | 120 | 120 | No | 356 | 70 | 80 |
| B | 240 | 240 | No | 407 | 52 | 70 |
| C | 360 | 360 | No | 428 | 30 | 50 |
| D | 120 | 120 | Yes | 256 | 70 | 80 |
| E | 60 | 60 | No | 285 | 85 | 92 |
| F | 120 | 120 | No | 195 | 70 | 80 |

Table 1 shows that each of the batteries of the present invention has high energy density and that batteries of various properties can be obtained, depending on the thickness of the active material layer. On the other hand, the battery of the comparative example was thicker considering its energy density, although exhibiting properties equivalent to those of the batteries of the examples. Moreover, the battery of the comparative example required significantly more complex manufacturing steps than those of the batteries of the examples, and its cost of production was also high. The production efficiency of the batteries of the examples was remarkably higher than that of the battery of the comparative example. From the foregoing, it can be seen that the present invention can provide a non-aqueous electrolyte secondary battery that is thin and has high energy density, as well as being capable of exerting sufficient properties, with high efficiency and at low cost.

INDUSTRIAL APPLICABILITY

As described above, the present invention can efficiently provide a thin, lightweight, high energy density non-aqueous electrolyte secondary battery with simplified packaging, using a simple method. The non-aqueous electrolyte secondary battery of the present invention is thin and lightweight, and therefore suitable for electronic equipment that are becoming increasingly smaller.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a battery assembly comprising a plurality of non-aqueous electrolyte secondary batteries, the method comprising the steps of:
   (1) discontinuously forming a plurality of positive electrode active material layers on an inner surface of a first outer jacket comprising a band-shaped positive electrode current collector except for a peripheral portion of said first outer jacket, thereby producing an assembly of a plurality of positive electrode plates;
   (2) forming a negative electrode active material layer on an inner surface of a second outer jacket comprising a sheet-shaped negative electrode current collector except for a peripheral portion of said second outer jacket, thereby producing a negative electrode plate;
   (3) integrating into one piece said positive electrode plate and said negative electrode plate, with a separator layer comprising a polymer electrolyte or a starting material thereof interposed between said positive electrode active material layer and said negative electrode active material layer;
   (4) bonding a peripheral portion of said positive electrode current collector and a peripheral portion of said negative electrode current collector, which face each other, with an insulating material interposed therebetween; and
   (5) bending said battery assembly at portions connecting the batteries in such a manner that current collectors having the same polarity of adjacent batteries face each other.

2. The method in accordance with claim 1, wherein said step (2) comprises a step of discontinuously forming a plurality of negative electrode active material layers on an inner surface of said second outer jacket comprising a band-shaped negative electrode current collector except for a peripheral portion of said second outer jacket, thereby producing an assembly of a plurality of negative electrode plates.

3. The method in accordance with claim 1, wherein each of said positive electrode plates is separated from said assembly, after said step (3).

4. The method in accordance with claim 2, wherein each of said negative electrode plates is separated from said assembly, after said step (3).

5. The method in accordance with claim 1, wherein said step (4) includes a step of providing unbonded regions between said peripheral portions that face each other, and further includes, after said step (4), a step of injecting a liquid non-aqueous electrolyte from said unbonded regions, followed by bonding said unbonded regions under a reduced pressure, with an insulating material interposed therebetween.

6. The method in accordance with claim 1, said step (2) is a step of discontinuously forming a plurality of negative electrode active material layers on an inner surface of said second outer jacket comprising a band-shaped negative electrode current collector except for a peripheral portion of said second outer jacket, thereby producing an assembly of a plurality of negative electrode plates,
said step (3) is a step of integrating into one piece said assembly of positive electrode plates and said assembly of negative electrode plates, with a separator layer comprising a polymer electrolyte or a starting material thereof interposed between each of said positive electrode active material layers and each of said negative electrode active material layers,
said step (4) is a step of bonding a peripheral portion of said positive electrode current collector and a peripheral portion of said negative electrode current collector that face each other, with an insulating material interposed therebetween, thereby producing a battery assembly, and
said method further includes a step of separating a resultant battery assembly at suitable positions.

7. The method in accordance with claim 6, wherein said step (1) comprises a step of discontinuously applying a positive electrode mixture on an inner surface of said first outer jacket comprising a band-shaped positive electrode current collector except for a peripheral portion of said first outer jacket, thereby forming a plurality of positive electrode active material layers,
said step (2) comprises a step of discontinuously applying a negative electrode mixture on an inner surface of said second outer jacket comprising a band-shaped negative electrode current collector except for a peripheral portion of said second outer jacket, thereby forming a plurality of negative electrode active material layers, and
said step (3) comprises a step of applying a paste comprising a polymer electrolyte or a starting material thereof on at least one of said plurality of positive electrode active material layers and said plurality of negative electrode active material layers.

8. A method for producing a battery assembly comprising a plurality of non-aqueous electrolyte secondary batteries, the method comprising the steps of:
   (1) forming a positive electrode active material layer on an inner surface of a first outer jacket comprising a sheet-shaped positive electrode current collector except for a peripheral portion of said first outer jacket, thereby producing a positive electrode plate;
   (2) discontinuously forming a plurality of negative electrode active material layers on an inner surface of a second outer jacket comprising a band-shaped negative electrode current collector except for a peripheral portion of said second outer jacket, thereby producing an assembly of a plurality of negative electrode plates;
   (3) integrating into one piece said positive electrode plate and said negative electrode plate, with a separator layer comprising a polymer electrolyte or a starting material thereof interposed between said positive electrode active material layer and said negative electrode active material layer;

(4) bonding a peripheral portion of said positive electrode current collector and a peripheral portion of said negative electrode current collector, which face each other, with an insulating material interposed therebetween; and (5) bending said battery assembly at portions connecting the batteries in such a manner that current collectors having the same polarity of adjacent batteries face each other.

9. The method in accordance with claim 8,
wherein said step (1) comprises a step of discontinuously forming a plurality of positive electrode active material layers on an inner surface of said first outer jacket comprising a band-shaped positive electrode current collector except for a peripheral portion of said first outer jacket, thereby producing an assembly of a plurality of positive electrode plates.

10. The method in accordance with claim 9,
wherein each of said positive electrode plates is separated from said assembly, after said step (3).

11. The method in accordance with claim 8,
wherein each of said negative electrode plates is separated from said assembly, after said step (3).

12. The method in accordance with claim 8,
wherein said step (4) includes a step of providing unbonded regions between said peripheral portions that face each other, and further includes, after said step (4), a step of injecting a liquid non-aqueous electrolyte from said unbonded regions, followed by bonding said unbonded regions under a reduced pressure, with an insulating material interposed therebetween.

13. The method in accordance with claim 8,
wherein said step (1) is a step of discontinuously forming a plurality of positive electrode active material layers on an inner surface of said first outer jacket comprising a band-shaped positive electrode current collector except for a peripheral portion of said first outer jacket, thereby producing an assembly of a plurality of positive electrode plates, said step (3) is a step of integrating into one piece said assembly of positive electrode plates and said assembly of negative electrode plates, with a separator layer comprising a polymer electrolyte or a starting material thereof interposed between each of said positive electrode active material layers and each of said negative electrode active material layers, said step (4) is a step of bonding a peripheral portion of said positive electrode current collector and a peripheral portion of said negative electrode current collector that face each other, with an insulating material interposed therebetween, thereby producing a battery assembly, and said method further includes a step of separating a resultant battery assembly at suitable positions.

14. The method in accordance with claim 13,
wherein said step (1) comprises a step of discontinuously applying a positive electrode mixture on an inner surface of said first outer jacket comprising a band-shaped positive electrode current collector except for a peripheral portion of said first outer jacket, thereby forming a plurality of positive electrode active material layers, said step (2) comprises a step of discontinuously applying a negative electrode mixture on an inner surface of said second outer jacket comprising a band-shaped negative electrode current collector except for a peripheral portion of said second outer jacket, thereby forming a plurality of negative electrode active material layers, and said step (3) comprises a step of applying a paste comprising a polymer electrolyte or a starting material thereof on at least one of said plurality of positive electrode active material layers and said plurality of negative electrode active material layers.

* * * * *